United States Patent
Shulman et al.

(10) Patent No.: US 11,706,650 B2
(45) Date of Patent: *Jul. 18, 2023

(54) ORCHESTRATION OF MULTIPLE WIRELESS SENSORS FOR MONITORING A WIRELESS SPECTRUM AND PROTOCOLS

(71) Applicant: AirEye Ltd., Hefer Valley (IL)

(72) Inventors: Amichai Shulman, Tel Aviv (IL); Shlomo Touboul, Kfar Chaim (IL); Ohad Plotnik, Savyon (IL); Roi Keren, Beit Halevi (IL)

(73) Assignee: AirEye Ltd, Hefer Valley (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,881

(22) Filed: Mar. 8, 2022

(65) Prior Publication Data
US 2022/0303803 A1 Sep. 22, 2022

Related U.S. Application Data

(63) Continuation of application No. 17/384,816, filed on Jul. 26, 2021, now Pat. No. 11,297,518.

(60) Provisional application No. 63/161,836, filed on Mar. 16, 2021.

(51) Int. Cl.
*H04W 4/00* (2018.01)
*H04W 24/08* (2009.01)
*H04W 24/02* (2009.01)
*H04W 24/10* (2009.01)
*H04W 12/122* (2021.01)

(52) U.S. Cl.
CPC ......... *H04W 24/08* (2013.01); *H04W 12/122* (2021.01); *H04W 24/02* (2013.01); *H04W 24/10* (2013.01)

(58) Field of Classification Search
CPC ... H04W 24/08; H04W 12/122; H04W 24/02; H04W 24/10; Y02D 30/70
USPC ................ 370/252–253, 329–330, 335–345
See application file for complete search history.

(56) References Cited

U.S. PATENT DOCUMENTS

| | | | |
|---|---|---|---|
| 8,755,365 B2 | 6/2014 | Lee et al. | |
| 11,297,518 B1* | 4/2022 | Shulman | H04W 24/10 |
| 2015/0296447 A1* | 10/2015 | Luo | H04W 48/16 370/338 |

(Continued)

*Primary Examiner* — Thai D Hoang
(74) *Attorney, Agent, or Firm* — Soquel Group I.P Ltd.

(57) ABSTRACT

Method for orchestrating wireless sensors, including registering each of a plurality of monitoring sensors that are attached to a respective plurality of wireless hosting equipment, with an orchestrator, generating, for each sensor, a monitoring plan including a description of wireless channels/protocols for the sensor to monitor, and amounts of time that the sensor should spend monitoring each channel/protocol prior to advancing to a next channel/protocol, wherein the monitoring plan for a sensor includes directives that instruct the sensor what to do when a monitoring period for a channel/protocol is interrupted before its intended monitoring time is finished, attempting, by the sensors, to monitor the channels/protocols specified in the sensor's monitoring plan in accordance with the time specified in the sensor's monitoring plan, and generating, by each sensor, an execution report including time spent at each channel/protocol, amount of data collected from each channel/protocol, and data captured from each channel/protocol.

10 Claims, 3 Drawing Sheets

(56) References Cited

U.S. PATENT DOCUMENTS

| | | | |
|---|---|---|---|
| 2015/0319235 A1* | 11/2015 | Liu | H04L 69/329 709/204 |
| 2016/0150535 A1* | 5/2016 | Tominaga | H04L 5/006 370/329 |
| 2016/0337947 A1* | 11/2016 | Beales | H04W 48/18 |

* cited by examiner

ORCHESTRATION OF MULTIPLE WIRELESS SENSORS FOR MONITORING A WIRELESS SPECTRUM AND PROTOCOLS

PRIORITY REFERENCE TO PROVISIONAL APPLICATION

This application claims benefit of and hereby incorporates by reference U.S. Provisional Application No. 63/161,836, entitled ORCHESTRATION OF MULTIPLE WIRELESS SENSORS FOR MONITORING A WIRELESS SPECTRUM AND PROTOCOLS, and filed on Mar. 16, 2021 by inventors Amichai Shulman, Shlomo Touboul, Ohad Plotnik and Roi Keren.

FIELD OF THE INVENTION

The present invention relates to orchestrating multiple wireless monitoring sensors to optimize their coverage of all wireless spectrum and wireless data protocols over time and space.

BACKGROUND OF THE INVENTION

Reference is made to FIG. 1, which is a prior art drawing of an airborne network attack, in accordance with an embodiment of the present invention. Shown in FIG. 1 is a real-life scenario with a conventional office 100 with conventional network security, including various security layers of data leak protection (DLP), wireless network security, a firewall, and a network access control (NAC). Also shown in FIG. 1 is a rogue antenna 200 acting as a wireless access point (AP). None of the above security layers address airborne attacks.

Antennas for hire are ubiquitous, inside and outside of corporate organizations, and within corporate airspace. It is believed that for every corporate access point, there are 200-250 antennas for hire. Antennas for hire are not within an organization's control. Many types of devices may be turned into rogue antennas. Examples include security cameras, smart locks, and heating, ventilation and air conditioning (HVAC) systems. It is known that the Emotet trojan has evolved to spread through Wi-Fi connections. Flaws have been found in Apple's Apple Wireless Direct Link (AWDL) protocol, which expose any iPhone within a hacker's Wi-Fi range.

Despite a highly secured wire and wireless corporate network, airborne threats risk (i) unauthorized access to a corporate network, (ii) network and device hijacking, and (iii) data leakage.

Unauthorized access to a corporate network abuses corporate and user devices that support dual connectivity, such as WifiDirect, user hotspots, and shadow AP, to serve as a stepping stone into the corporate network. Network and device hijacking uses a rogue antenna within the corporate proximity to grab credentials, and to inject malware and certificates. Data leakage involves corporate data leaving the secure corporate network through an unsupervised network channel; e.g., malware exfiltrates data or an employee mistakenly, or un-mistakenly sends an e-mail.

Wireless monitoring sensors are being introduced to address airborne network attacks. A wireless monitoring sensor operates by retrieving all frames transmitted over the air and either analyzing them locally, sending them for further analysis by a central system, or a combination of both. Wireless monitoring sensors are used for various purposes such as cyber security, network performance measurement, network optimization and even indoor navigation. A wireless monitoring sensor may retrieve frames from a single channel at a time. There are approximately 60 channels for Wi-Fi. Thus, in order to allow monitoring the entire spectrum, a single sensor must constantly move from channel to channel, in a scheme called "channel hopping". The sensor picks up information from a single channel for a short period of time and then moves to a next channel to pick up information from that channel, and so on. The more channels that are covered by a single sensor, the less information is collected from each channel, reducing the accuracy and efficacy of the sensor and the system that uses it.

Moving between channels is a time-consuming task, due to physical aspects of the antenna. Additionally, a sensor may share the antenna resource, and the wireless communications chip attached to it, with additional functional modules, as well as other resources such as CPU and memory. Such is the case for a wireless sensor deployed as a software module over a conventional operating system, e.g., Microsoft Windows or Apple MacOS. This further reduces the ability of a sensor to properly monitor every channel.

A wireless sensor is also limited by the physical area it collects frames for. A single sensor generally covers an area of 100-150 sq. m. Hence multiple sensors are required in order to monitor wireless traffic in larger areas. For some usage scenarios multiple sensors positioned in different locations may be required in order to correctly monitor wireless traffic of the same area; e.g., indoor navigation or asset location tracking.

It is thus clear that given a multitude of wireless sensors deployed, either temporarily or constantly, in a given physical environment, their monitoring capability should be optimized so that different sensors monitor different channels or different protocols at different times to provide an optimal coverage for the entire spectrum and protocols.

SUMMARY

Embodiments of the present invention provide systems and methods for orchestrating multiple wireless monitoring sensors in order to optimize their coverage of all wireless spectrum over time and space.

One approach to distributing the monitoring of different channels between different sensors is to have each sensor take a best effort approach to monitoring all channels, with the hope that enough information is collected per each channel. While this approach may work in the long run it cannot guarantee any accuracy for any given period of time and may leave entire channels unmonitored for arbitrary periods of times. Also, if a specific sensor is monitoring protocol A, another sensor may be required to monitor protocol B, again to optimize the protocol monitoring coverage.

Another approach is to arbitrarily assign each sensor a static list of channels or protocols to monitor and have each senor take a best effort approach to monitoring all channels or protocols. This approach fails, as it has no consideration for the location or operation of a sensor and thus cannot guarantee good coverage across time or space both in the long and short term.

Yet another approach uses dedicated sensors that constantly move between channels. This approach achieves better results than the other methods in the short term, but requires separate devices and may achieve poor coverage for congested channels.

Embodiments of the present invention use a central orchestration module (COM) that coordinates operation of individual wireless communication monitoring sensors.

There is thus provided in accordance with the present invention a method for orchestrating wireless monitoring sensors to optimize their coverage of multiple data channels and protocols, including registering each of a plurality of monitoring sensors that are attached to a respective plurality of wireless hosting equipment, with an orchestrator, generating, by the orchestrator for each of the sensors, a monitoring plan including a description of wireless channels and protocols for the sensor to monitor, and amounts of time that the sensor should spend monitoring each channel/protocol prior to advancing to a next channel/protocol, wherein the monitoring plans attempt to maximize average coverage by the sensors across all channels/protocols while retaining redundancy of sensor coverage, transmitting, by the orchestrator to each of the sensors, the monitoring plan generated by the orchestrator for the sensor, attempting, by each of the sensors via the sensor's hosting equipment, to monitor the channels/protocols specified in the sensor's monitoring plan in accordance with the amounts of time specified in the sensor's monitoring plan, generating from time to time, by each sensor, an execution report including, for each channel/protocol monitored by the sensor, the actual time spent at the channel/protocol, the actual amount of data collected from the channel/protocol, and data captured from the channel/protocol, transmitting from time to time, by each sensor to the orchestrator, the execution report generated by the sensor, generating, by the orchestrator from the execution reports, a current time/space coverage map indicating coverage of each channel over space and time, generating, by the orchestrator for one or more of the sensors, one or more respective updated monitoring plans, based on the current time/space coverage map, and transmitting, by the orchestrator to the one or more of the sensors, the one or more respective updated monitoring plans.

Additionally in accordance with an embodiment of the present invention, the orchestrator determines, from time to time, current locations of the sensors.

Further in accordance with an embodiment of the present invention, the orchestrator determines the current location of the sensors based on source media access control (MAC) address information in beacon frames transmitted by one or more the sensors in their respective one or more execution reports.

Yet further in accordance with an embodiment of the present invention, the orchestrator determines the current location of the sensors by generating a feature vector for each sensor, each entry in the feature vector including an average relative signal strength indicator (RSSI) for a MAC address of a wireless access point in data captured by the sensor from a channel/protocol, and spatially clustering the generated feature vectors, wherein the monitoring plans attempt to maximize average coverage across all channels/protocols in each cluster.

Moreover in accordance with an embodiment of the present invention, entries in the feature vector of each sensor include average received signal strength indicator (RSSI) for MAC addresses of wireless access points that publish network names.

Additionally in accordance with an embodiment of the present invention, the orchestrator generates, for one or more of the sensors, respective one or more updated monitoring plans, when a specific sensor is moved out if its spatial cluster; and transmits the one or more updated monitoring plans to the respective one or more of the sensors.

Additionally in accordance with an embodiment of the present invention, one of the sensors recognizes a channel and/or protocol that is missing from the sensor's monitoring plan, and transmits to the orchestrator, information regarding the missing channel and/or protocol, and the orchestrator generates one or more updated monitoring plans for respective one of more of the sensors, to cover the missing channel and/or protocol, and transmits the one or more updated monitoring plans to the respective one or more of the sensors.

BRIEF DESCRIPTION OF THE DRAWINGS

The present invention will be more fully understood and appreciated from the following detailed description, taken in conjunction with the drawings in which.

DETAILED DESCRIPTION

Figure 1:
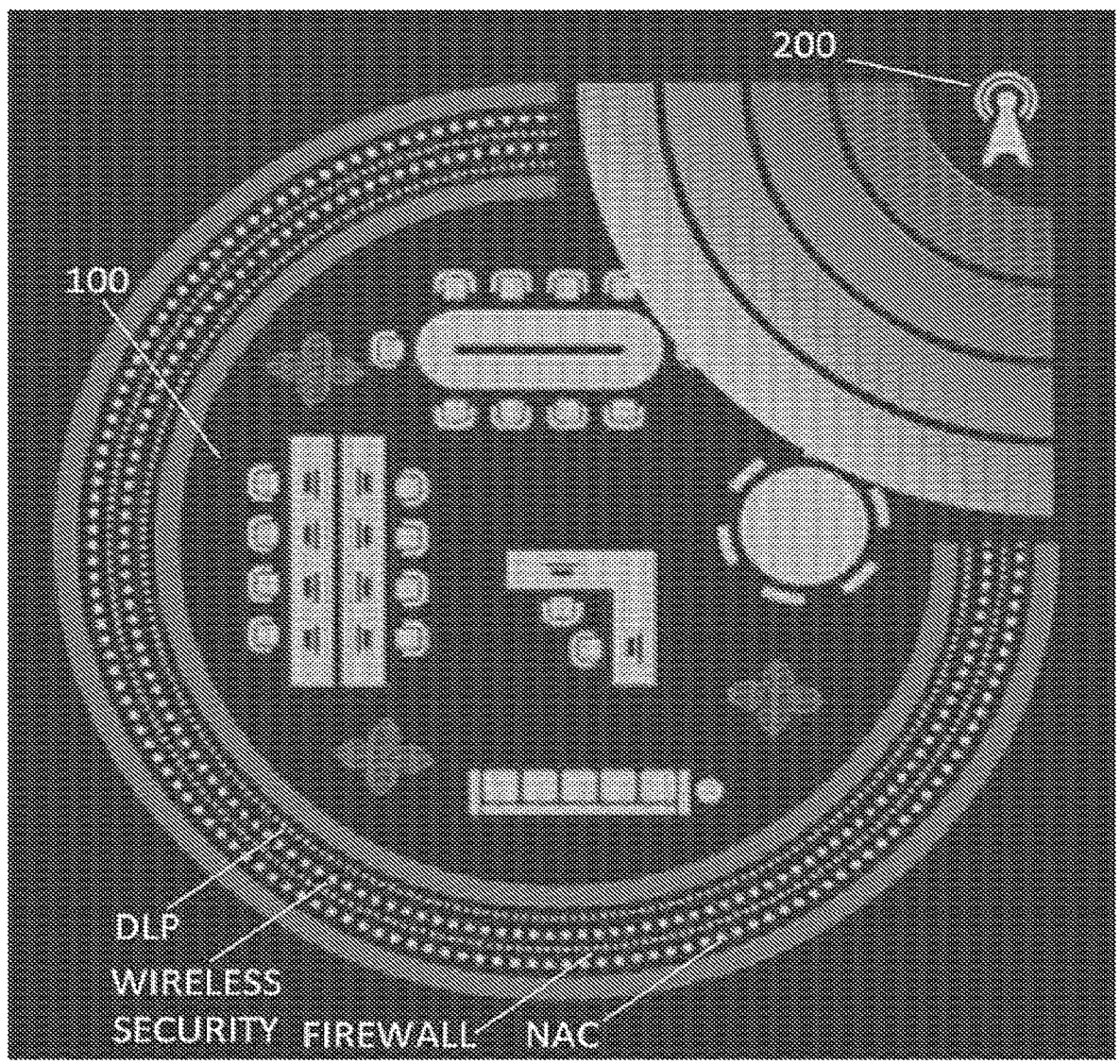
FIG. 1 is a prior art drawing of an airborne network attack, in accordance with an embodiment of the present invention.
Figure 2:
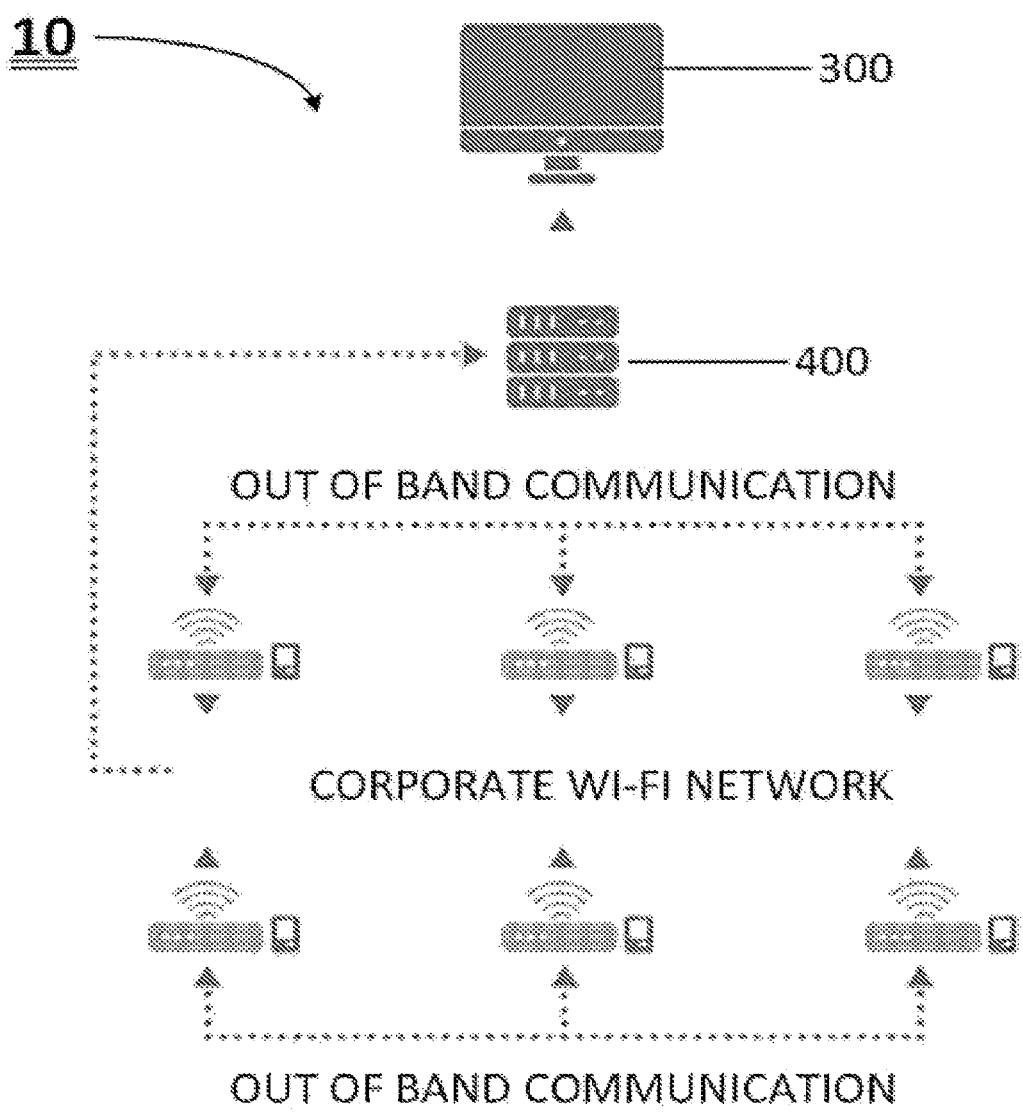
FIG. 2 is simplified drawing of a system for orchestrating multiple wireless sensors, in accordance with an embodiment of the present invention.

Reference is made to FIG. 2, which is a simplified drawing of a system 10 for orchestrating multiple wireless sensors, in accordance with an embodiment of the present invention. Shown in FIG. 2 is a central orchestration module (COM) 300, and a plurality of wireless monitoring sensors 400. COM 300 may be cloud-based, or alternatively hosted on a corporate server computer. Sensors 400 may be stand-alone devices attached to wireless equipment, or alternatively may be integrated into corporate computers, routers and other devices, which serve as their hosts. In the latter case, sensors 400 share CPU and memory with their host devices. Communication between sensors 400 and COM 300 is performed out of band.

Operation of COM 300 and sensors 400 is described below and shown in FIG. 3.

COM 300 frequently provides each sensor 400 with a channel/protocol monitoring plan (CMP). The CMP includes a description of channels and protocols to monitor and the time to spend in each channel before moving to another channel or protocol in the CMP.

Each sensor 400 makes a best effort attempt to execute the sensor's CMP. However, when sensor 400 is subject to performance and energy consumption constraints by the hosting station, sensor 400 may not be able to execute its CMP as expected. From time to time, each sensor 400 provides COM 300 with a plan execution report (PER). The PER contains information about the actual time spent in each channel and the actual amount of data collected from each channel. Additionally, sensor 400 sends to COM 300 information captured from the monitored channels. This information includes types of messages. e.g., Beacon Frame, Data and Probe Request in Wi-H networks; wireless addressing information, e.g., basic service set identifier (BSSID), and media access control (MAC) addresses in Wi-Fi networks; protocol type and information; channel information; and radio information, e.g. received signal strength indicator (RSSI) and new radio (NR) in Wi-Fi networks.

COM 300 processes the captured information to generate a mapping of the sensors' 400 space coverage. This mapping provides COM 300 with information about which sensors 400 share the same physical space, and may therefore split the channel coverage between them.

COM 300 further maintains a channel time/space coverage map that indicates how well each channel is covered over time and space. COM 300 uses the PERs to update the coverage map.

Based on the up-to-date coverage map and the PERs, COM 300 may decide to send a new CMP to one or more of sensors 400.

Channel Monitoring Plan

The CMP instructs sensor 400 which channels and protocols to monitor and for how long, how to switch between channels/protocols, and how to handle interruptions during execution of the CMP.

First and foremost, the CMP includes a list of channels and protocols to monitor. The list may be an ordered list, indicating the order in which channels and protocols should be traversed, or an unordered list, allowing sensor 400 to choose the order in which channels/protocols are traversed. The main consideration in ordering channels/protocols is to minimize the down time of the wireless equipment when transitioning between two consecutive channels in the list. E.g., it might be the case that listening on a 5 GHz channel and then moving to listen on a 2 GHz channel incurs less downtime than moving from one 5 GHz channel to another. Another example might be the case that listening on protocol A and interpreting its content and then moving to listen on protocol C incurs less downtime than vice versa. An advantage of implementing the channel and protocol ordering algorithm in COM 300 is keeping the sensor code smaller and simpler. An advantage of implementing the channel and protocol ordering algorithm in sensor 400 reduces the load on COM 300 and makes it easier to adapt the algorithm to the specific wireless equipment to which sensor 400 is attached. A CMP may include one or more channels/protocols to monitor. If the CMP includes a single channel/protocol, then sensor 400 should spend any available monitoring time slot listening on that single channel or protocol.

The CMP also includes timing of transitions between channels/protocols. Timing information is not required if the CMP only includes a single channel/protocol. The simplest method for describing the timing is by including a single period parameter in the list that indicates how much time sensor 400 should be listening on each channel/protocol in the CMP before moving to the next channel or protocol. A more complex method may include a different period parameter per each channel in the CMP.

The timing information may include trigger events for moving between channels or protocol. E.g., the period parameter may be regarded as a maximum amount of time to spend on each channel/protocol, and the timing information may include an instruction to move to the next channel/protocol in the CMP if a certain number of beacon frames was already detected on the channel—even before the end of the time period. Timing information may include randomization instructions. I.e., the sensor randomly chooses a short random period of time, within provided boundaries, to add or subtract to each period of time spent on each channel.

The CMP also includes executing directives that indicate to sensor 400 how to behave, given the constraints of its hosting environment. These directives instruct sensor 400 what to do after a monitoring period was interrupted before its intended finish time. There are three available modes: resume, transition and restart. In resume mode, sensor 400 attempts to monitor the same channel/protocol it was monitoring when interrupted—for the remaining amount of time. In transition mode, sensor 400 monitors the next channel/protocol in the CMP when monitoring becomes available again. In restart mode, sensor 400 starts from the beginning of the CMP when monitoring becomes available again. Sensor 400 may get permission to adjust its CMP parameters. In such a case, sensor 400 reports back to COM 300 the changes it made.

EXAMPLE I below, in JSON format, shows a resume mode CMP ("on-interrup": "resume"), in which the order of hopping between the channels is determined by the orchestrator, and not by the sensor. The CMP specifies two protocols to monitor, Wi-Fi ("protocol": "Wi-Fi") and Bluetooth Low Energy ("protocol": "BLE"). The CMP specifies an order ("order": "strict"). The CMP specifies three Wi-Fi channels (channels 1, 2.4 and 44) and one BLE channel (channel 30). Each channel has an individual monitoring time. If monitoring of a channel is interrupted before the indicated monitoring time, monitoring will resume with the same channel next time, attempting to complete the remaining monitoring time.

EXAMPLE I:

```
{
  "CMP": {
    "policy": {
      "order": "strict",
      "timing": "individual",
      "trigger": "none",
      "on-interrup": "resume"
    }
    "channel-spec": [
      {
        "protocol": "Wi-Fi",
        "band": "2.4"
        "channel": 1
        "order": 1
        "time": 2
      },
      {
        "protocol": "Wi-Fi",
        "band": "2.4"
        "channel": 3
        "order": 2
        "time": 2
      },
      {
        "protocol": "Wi-Fi",
        "band": "5"
        "channel": 44
        "order": 3
        "time": 3
      },
      {
        "protocol": "BLE",
        "channel": 30
        "order": 4
        "time": 1
      }
    ]
  }
}
```

EXAMPLE II below, in JSON format, shows another resume mode CMP. In EXAMPLE II, the order is not set by the orchestrator ("order": "none"), and is left to the sensor's discretion.

EXAMPLE II:

```
{
  "CMP": {
```

EXAMPLE II:

```
"policy": {
    "order": "none",
    "timing": "individual",
    "trigger": "none",
    "on-interrup": "resume"
}
"channel-spec": [
    {
        "protocol": "Wi-Fi",
        "band": "2.4"
        "channel": 1
        "time": 2
    },
    {
        "protocol": "Wi-Fi",
        "band": "2.4"
        "channel": 3
        "time": 2
    },
    {
        "protocol": "Wi-Fi",
        "band": "5"
        "channel": 44
        "time": 2
    },
    {
        "protocol": "BLE",
        "channel": 30
        "time": 2
    }
]
}
}
```

EXAMPLE III below, in JSON format, shows another resume mode CMP. In EXAMPLE III, the channels are not allocated individual monitoring time, but instead they are allocated a global monitoring time of 3 ms ("timing": "global", "time": 3). Additionally, this time should be randomized by 10% ("time-rand": 10) for every monitoring cycle; i.e., it may take any value between 2.7 ms to 3.3 ms (3±10%).

EXAMPLE III:

```
{
  "CMP": {
    "policy": {
        "order": "none",
        "timing": "global",
        "time": 3,
        "time-rand": 10,
        "trigger": "none",
        "on-interrup": "resume"
    }
    "channel-spec": [
        {
            "protocol": "Wi-Fi",
            "band": "2.4",
            "channel": 1
        },
        {
            "protocol": "Wi-Fi",
            "band": "2.4",
            "channel": 3
        },
        {
            "protocol": "Wi-Fi",
            "band": "5",
            "channel": 44
        },
        {
            "protocol": "BLE",
            "channel": 30
```

```
        }
    ]
  }
}
```

EXAMPLE IV below, in JSON format, shows a transition mode CMP ("on-interrup": "transition"). EXAMPLE IV includes a reporting element that indicates that a PER report needs to be sent every 60 seconds ("reporting-frequency": 60).

EXAMPLE IV:

```
{
  "CMP": {
    "policy": {
        "order": "strict",
        "timing": "individual",
        "trigger": "none",
        "on-interrup": "transition"
    },
    "reporting": {
        "reporting-frequency": 60
    },
    "channel-spec": [
        {
            "protocol": "Wi-Fi",
            "band": "2.4"
            "channel": 1
            "order": 1
            "time": 2
        },
        {
            "protocol": "Wi-Fi",
            "band": "2.4"
            "channel": 3
            "order": 2
            "time": 2
        },
        {
            "protocol": "Wi-Fi",
            "band": "5"
            "channel": 44
            "order": 3
            "time": 2
        },
        {
            "protocol": "BLE",
            "channel": 30
            "order": 4
            "time": 2
        }
    ]
  }
}
```

EXAMPLE V below, in JSON format, shows a restart mode CMP ("on-interrup": "restart"). EXAMPLE V has a trigger type of beacon-count ("trigger": "beacon-count"), indicating that monitoring of a channel may be stopped before the allocated time, when 20 beacon frames ("beacon-count": 20) are collected. It also indicates a detailed PER needs to be sent once every 10 PERs ("detailed-reporting": 10).

EXAMPLE V:

```
{
  "CMP": {
    "policy": {
```

-continued

EXAMPLE V:

```
    "order": "strict",
    "timing": "global",
    "time": 3,
    "time-rand": 10,
    "trigger": "beacon-count",
        "beacon-count": 20,
        "on-interrup": "restart"
    },
    "reporting": {
        "reporting-frequency": 60,
        "detailed-reporting": 10
    },
    "channel-spec": [
        {
            "protocol": "Wi-Fi",
            "band": "2.4",
            "channel": 1,
            "order": 1
        },
        {
            "protocol": "Wi-Fi",
            "band": "2.4",
            "channel": 3,
            "order": 2
        },
        {
            "protocol": "Wi-Fi",
            "band": "5",
            "channel": 44,
            "order": 3
        },
        {
            "protocol": "BLE",
            "channel": 30,
            "order": 4
        }
    ]
}
```

The CMP may also include an indication of the type of reporting and frequency of reporting expected from sensor 400.

Sensor 400 may mark one of the wireless channels as its "home wireless channel" (HWC). The HWC is the wireless channel and protocol used by the station hosting sensor 400 for normal communication. Sensor 400 may attempt to monitor the HWC through the normal course of communication—regardless of whether the HWC appears in the CMP. The sensor 400 informs the COM 300 about its HWC either through a dedicated message or implicitly through the PER.

Plan Execution Report

Sensor 400 constantly monitors and measures its actual execution of the CMP. The measurements are used for generating a PER that is sent to COM 300 from time to time. The PER refers to a specific period of time, which is explicitly provided in the report. The PER has a summary part and an optional detailed part.

The summary part of the PER includes the total amount of time spent monitoring, number of plan execution cycles, i.e. how many times the sensor was able to go through the entire CMP, and statistics about the time spent monitoring each channel. Statistics may include average time in each channel, or protocol standard deviation from the average and median time spent in each channel/protocol. The summary part also contains information about the average length and frequency of monitoring time slots. These may be represented as a single figure for average and standard deviation for each time slot, or it may be a histogram for discrete sizes of time slots, e.g. short slots, medium slots, long slots.

The detailed part of the PER includes information on the monitoring of each channel/protocol in each execution cycle of the CMP. The information includes the time when monitoring of the channel started and the amount of time spent monitoring that channel or protocol. If execution mode is "resume" (see above) then the detailed report may include multiple records for the same channel for the same execution period.

The frequency of sending PERs to COM 300 may be set in the sensor code, or by a configuration message sent from COM 300 to sensor 400, or may be part of the CMP—allowing different CMPs to require different reporting frequencies. E.g., the initial CMPs sent to sensor 400 require higher frequency reporting and, as the environment becomes stable, the requested reporting frequency drops.

The PER contains, in each of its parts, a separate entry for the monitoring of the HWC. The summary part of the report includes only summary information about monitoring of the HWC; inter alia, total time, and average time spent in each monitoring cycle. The detailed part of the PER includes a list of monitoring cycles, where each cycle includes start time and time spent monitoring in that cycle.

EXAMPLE VI below, in JSON format, shows a PER including only a summary part. The PER in EXAMPLE VI may correspond to any of the CMPs in EXAMPLES I-V. The first Wi-Fi channel is marked as the HWC of the device hosting the sensor ("is-hwc": "true").

EXAMPLE VI:

```
{
    "PER": {
        "report-time": {
            "start-time": 62039420342,
            "end-time": 62039560457
        },
        "summary": {
            total-time: 10000,
            total-cycles: 20,
            "channels": [
                {
                    "protocol": "Wi-Fi",
                    "band": "2.4",
                    "channel": 1,
                    "is-hwc": "true",
                    "total": 2543,
                    "count": 20,
                    "avg": 102,
                    "sdev": 43,
                    "median": 95
                },
                {
                    "protocol": "Wi-Fi",
                    "band": "2.4",
                    "channel": 3,
                    "total": 2475,
                    "count": 20,
                    "avg": 96,
                    "sdev": 41,
                    "median": 100
                },
                {
                    "protocol": "Wi-Fi",
                    "band": "5",
                    "channel": 44,
                    "total": 2301,
                    "count": 19,
                    "avg": 96,
                    "sdev": 21,
                    "median": 92
                },
                {
                    "protocol": "BLE",
                    "channel": 30,
```

EXAMPLE VI:

```
        "order": 4
        "total": 2551,
        "count": 20,
        "avg": 101,
        "sdev": 35,
        "median": 95
      }
    ]
  }
}
```

EXAMPLE VII below, in JSON format, shows a PER including both a summary part and a detailed part. The PER in EXAMPLE VII may correspond to any of the CMPs in EXAMPLES I-V. The first Wi-Fi channel is marked as the HWC of the device hosting the sensor ("is-hwc": "true").

EXAMPLE VII:

```
{
  "PER": {
    "report-time": {
       "start-time": 62039420342,
       "end-time": 62039560457
    },
    "summary": {
      total-time: 10000,
      total-cycles: 20,
      "channels": [
        {
          "protocol": "Wi-Fi",
          "band": "2.4",
          "channel": 1,
          "is-hwc": "true",
          "total": 2543,
          "count": 20,
          "avg": 102,
          "sdev": 43,
          "median": 95
        },
        {
          "protocol": "Wi-Fi",
          "band": "2.4",
          "channel": 3,
          "total": 2475,
          "count": 20,
          "avg": 96,
          "sdev": 41,
          "median": 100
        }
      ]
   },
   "details": [
    {
      "protocol": "Wi-Fi",
      "band": "2.4",
      "channel": 1,
      "start-time": 62039420342,
      "time": 10
    },
    {
      "protocol": "Wi-Fi",
      "band": "2.4",
      "channel": 3,
      "start-time": 62039420365,
      "time": 9
    },
    {
      "protocol": "Wi-Fi",
      "band": "2.4",
      "channel": 1,
      "start-time": 62039420383,
      "time": 10
    },
```

EXAMPLE VII:

```
    {
      "protocol": "Wi-Fi",
      "band": "2.4",
      "channel": 3,
      "start-time": 62039420365,
      "time": 9
    },
    {
      "protocol": "Wi-Fi",
      "band": "2.4",
      "channel": 3,
      "start-time": 62039420387,
      "time": 9
    },
    {
      "protocol": "Wi-Fi",
      "band": "2.4",
      "channel": 3,
      "start-time": 62039420402,
      "time": 10
    },
    {
      "protocol": "Wi-Fi",
      "band": "2.4",
      "channel": 1,
      "start-time": 62039420441,
      "time": 7
    },
   ]
 }
```

System Workflow

When COM 300 is initialized, it generally has no knowledge of sensors 400 and their locations, and hence no coverage is assumed for any channel anywhere.

When a new sensor 400 registers with COM 300, COM 300 generally has no knowledge of its physical location. Hence the purpose of the initial CMP is to provide as much information as possible about the location of sensor 400 with respect to the other sensors 400 in the system, if other sensors 400 are present. Possible ways to allocate the initial CMP include:

A null CMP that includes no channel. The meaning of this CMP is that sensor 400 only attempts to monitor its home channel during normal communications time.

An HWC CMP that includes all channels known to be an HWC for some previously registered sensor 400.

An all-channel plan that includes all wireless channels with a short, arbitrary uniform time slot for all channels.

An all-protocol plan that includes all wireless protocols with a short, arbitrary uniform time slot for all protocols.

Once the location of sensor 400 has been established with respect to the other sensors 400 in the system, COM 300 starts optimizing the channel/protocol coverage for the physical area in which sensor 400 is located.

The initial locating stage for sensor 400 may be skipped if location information is provided in an alternative way, such as high-resolution GPS information provided by sensor 400 to COM 300 upon registration and frequently thereafter.

Determining Relative Sensor Locations

When sensor 400 registers with COM 300, the first priority of system 10 is to locate sensor 400, and only then optimize on the channel coverage. Identifying the location of sensor 400 based on captured data may be achieved in many ways.

One way is to employ geometrical optimization algorithms based on the RSSI and source MAC address information in captured beacon frames. These algorithms provide the distance, based on signal strength interpretation, of the reporting sensor 400 from several stationary objects such as wireless access points. These algorithms place the different sensors 400 on a grid, creating a virtual map of the airspace.

An alternative algorithm uses the same information to feed a machine learning clustering algorithm in the following manner:

A feature vector is generated for each sensor 400. Each entry in the feature vector is the average RSSI for a MAC address of an access point, or in the simpler case, a 1 bit if the MAC address appears in the captured data from the sensor and a 0 bit otherwise.

A clustering algorithm is applied to the feature vectors of all sensors 400, yielding clusters of sensors. COM 300 considers all sensors 400 in a cluster as covering the same physical space, which is referred to as "patch".

The clustering algorithm may be constrained to generate no more clusters than the number of access points.

The clustering algorithm may be constrained to including only observation from the captured data that belong to access points that publish specific network names (SSID).

The chosen clustering algorithm should be appropriate for running frequently, as more captured data and more sensors become available to COM 300.

The process of monitoring sensor 400's location continues after the initial establishment of the sensor 400's relative location and the initial division of the airspace into patches. From time to time COM 300 may decide to rerun the entire location algorithm and recompute the way sensors 400 are placed into patches.

Establishing Channel Monitoring Profile for a Sensor

In order to provide optimal coverage for channels in the proximity of sensor 400, COM 300 may establish a monitoring profile for sensor 400. The monitoring profile indicates how much monitoring time sensor 400 is capable of providing, and the size of monitoring timeslots available. While the monitoring profile for sensor 400 may change over long periods of time, over short spikes of especially intense work, or over unusually idle periods, the monitoring profile is expected to remain relatively constant for periods of minutes.

A CMP is generated for sensor 400 based on sensor 400's monitoring profile. For example, a sensor 400 with longer monitoring time slots may switch between multiple channels, and sensor 400's execution mode may be "transition". A sensor 400 with short and frequent monitoring time slots should switch between multiple channels in "resume" mode.

COM 300 uses the execution report sent by sensor 400 to update the monitoring profile of sensor 400.

Optimizing Channel and Protocol Coverage

When the location of sensor 400 is determined by COM 300, COM 300 begins optimizing the CMP of that sensor 400 and other sensors 400 in the same patch for channel/protocol coverage. As previously explained, the physical space is split into individual patches and coverage for each channel/protocol is measured per each patch. Coverage is measured as percentage of time that the channel or protocol is being monitored. Thus if a channel is being monitored, on the average, 10 ms every second, then its coverage is 1%. A goal of the COM 300 is to maximize average coverage across all channels. This may also include the number of sensors and the length of each monitoring slot, which may be measured as the reverse of largest non-monitoring slot.

If sensor 400 is the only sensor in a patch then its initial CMP is the "all-channel/protocol" plan (see above). The initial monitoring time slot per channel is a system-wide parameter. If sensor 400 is located in a patch with other sensors 400, then a CMP is generated based on the coverage map of the channels in the patch to achieve the following:

Decrease the number of channels/protocols monitored by each sensor 400, since the time spent moving between channel/protocol is substantial and cannot be used for monitoring.

Increase the average coverage time across channels/protocols, by increasing the coverage of individual channels.

Reduce the standard deviation of coverage time across channel/protocol, by attempting to spend equal time in each channel.

Maintain some redundancy between sensors covering each individual channel/protocol, ensuring that losing a single sensor 400 does not result in loss of coverage for some channel.

COM 300 may generate a CMP for a new sensor 400 and immediately generate adjusted CMPs for all other sensors 400 in the same patch that are affected, e.g., some sensors 400 may be instructed to monitor less channels. Alternatively, COM 300 may generate and transmit the CMP to the new sensor 400, but only after validating proper execution of the CMP, based on the PERs, generate and transmit adjusted CMPs for the rest of the affected sensors 400 in the same patch.

When a specific sensor 400 fails to send PERs for some time, specified at system configuration, the specific sensor 400 is considered removed from the patch, and COM 300 generates new CMPs for sensors 400 in the same patch of the specific sensor to compensate for the missing coverage.

When sensor 400 detects a new channel or protocol not included in the sensor 400's CMP, sensor 400 notifies COM 300, which may issue a modified CMP to this sensor 400 or to other sensors 400.

When a specific sensor 400's location changes significantly in a way that reflects its transition from one patch to another patch, COM 300 processes the specific sensor 400's removal from the original patch, by adjusting the CMPs for sensors 400 in that patch, and then considering the specific sensor 400 to be a new sensor 400 in a new patch, with the advantage of possibly knowing the monitoring profile for that sensor 400.

When a specific sensor 400 sends a series of PERs that reflect failure to execute on the CMP, then COM 300 may generate a new CMP to match the specific sensor 400's capabilities, and then generate new CMPs for each of the other sensors 400 in the same patch, to restore optimal coverage given the new constraints.

COM 300 may decide from time to time to evaluate the coverage of channels in individual patches and to generate new CMPs for all sensors 400 in the patch based on their recent PERs, with the goal of improving their coverage.

It will be appreciated by those skilled in the art that embodiments of the present invention orchestrate some of the sensors 400 to operate in a manner optimized for data collection, whereas other sensors 400 are optimized for detection and response.

Figure 3:
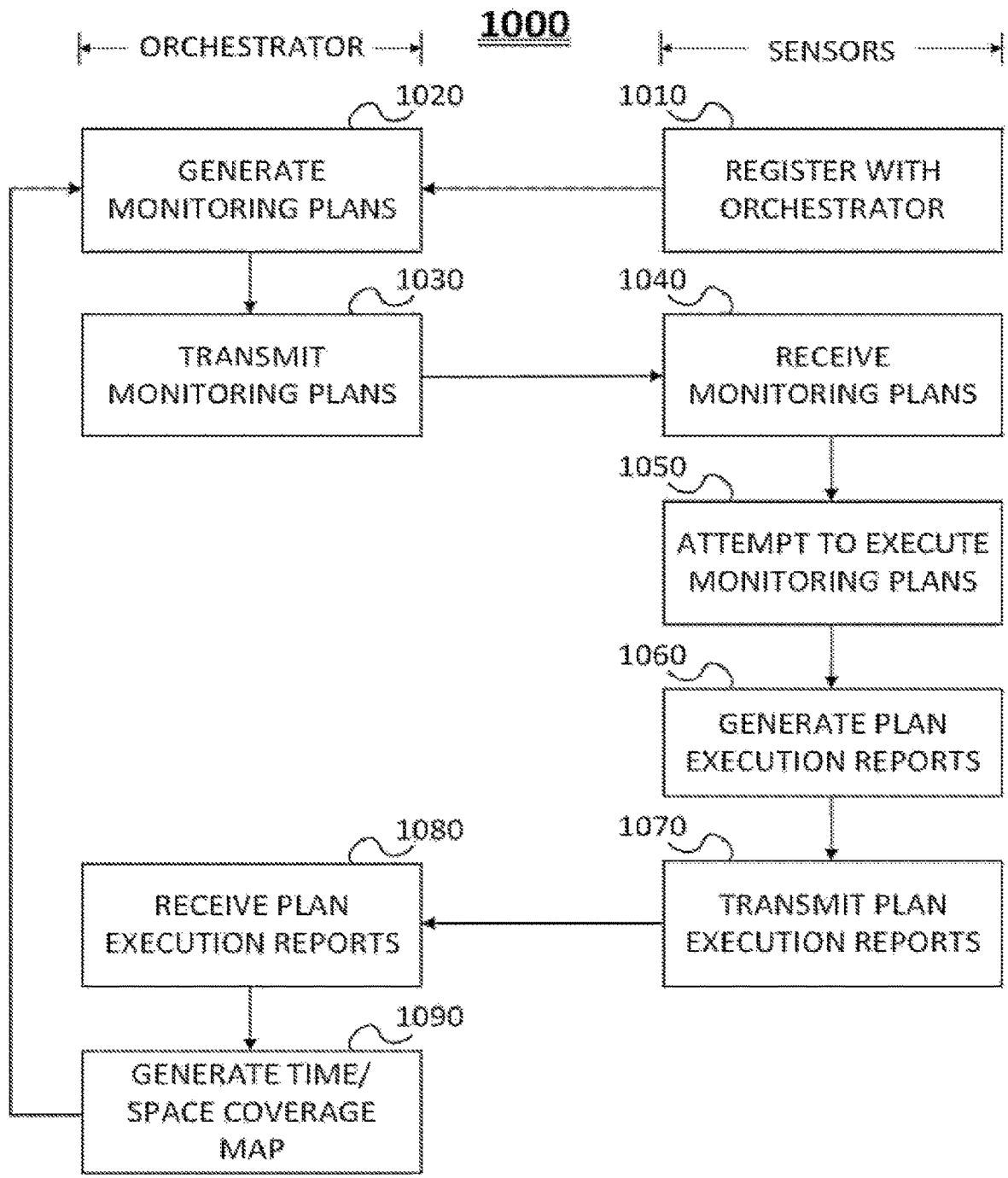
FIG. 3 is a simplified flowchart of a method for an orchestrator to orchestrate multiple wireless sensors, in accordance with an embodiment of the present invention.

Reference is made to FIG. 3, which is a simplified flowchart of a method 1000 for an orchestrator 300 to orchestrate multiple wireless sensors 400, in accordance with an embodiment of the present invention. The flowchart of FIG. 3 is divided into two columns. The left column indicates operations performed by COM 300. The right column indicates operations performed by sensors 400.

At operation 1010 sensors 400 register with orchestrator 300. At operation 1020 COM 300 generates CMPs for sensors 400. Each CMP includes a description of wireless channels and protocols for a corresponding sensor 400 to monitor, and amounts of time that sensor 400 should spend monitoring each channel/protocol prior to advancing to a next channel/protocol. The CMPs attempt to maximize average coverage by sensors 400 across all channels/protocols while retaining redundancy of sensor coverage.

At operation 1030 COM 300 transmits the CMPs to sensors 400, and at operation 1040 sensors 400 receive their respective CMPs. At operation 1050 sensors 400 attempt, via their hosting equipment, to execute their respective CMPs; i.e., to monitor the channels/protocols specified in the sensors' CMP in accordance with the amounts of time specified in the sensors' CMP.

At operation 1060 sensors 400 generate PERs, which include, for each channel/protocol monitored by the sensors, the actual time spent at the channel/protocol, the actual amount of data collected from the channel/protocol, and data captured from the channel/protocol. At operation 1070 sensors 400 transmit their PERs to COM 300, and at operation 1080 COM 300 receives the PERs.

At operation 1090, COM 300 generates, from the PERs, a current time/space coverage map indicating coverage of each channel over space and time. Method 1000 then loops back to operation 1020, where COM 300 generates updated CMPs, based on the current time/space coverage map generated at operation 1090.

It will thus be appreciated by those skilled in the art that the embodiments of the present invention provide the following advantages. They constantly monitor and analyze all wireless communication channels in real time. They quickly identify corporate assets and channels, and classify different types of devices and networks around the channels. They detect insecure interactions and actively terminate any potential association between devices involved. They integrate alerts with a corporate security information and event management (SIEM). They provide executive and operation reports on blocked airborne attacks. They require no endpoint agents, and no network configuration changes.

Embodiments of the present invention provide 802.11 attack protection, compliance with payment card industry data security standard (PCI DSS) wireless requirements, granular wireless access policy based inter glia on time and location, forensics data, and threat assessments.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification is to be regarded in an illustrative rather than a restrictive sense.

What is claimed is:

1. A method for orchestrating wireless monitoring sensors to optimize their coverage of multiple data channels and protocols, comprising:

registering each of a plurality of monitoring sensors that are attached to a respective plurality of wireless hosting equipment, with an orchestrator;

generating, by the orchestrator for each of the sensors, a monitoring plan comprising a description of wireless channels and protocols for the sensor to monitor, and amounts of time that the sensor should spend monitoring each channel and protocol prior to advancing to a next channel and protocol, wherein the monitoring plans attempt to maximize average coverage by the sensors across all channels and protocols while retaining redundancy of sensor coverage, and wherein the monitoring plan for a sensor includes directives that instruct the sensor what to do when a monitoring period for a channel and protocol is interrupted before its intended monitoring time is finished;

transmitting, by the orchestrator to each of the sensors, the monitoring plan generated by the orchestrator for the sensor;

attempting, by each of the sensors via the sensor's hosting equipment, to monitor the channels and protocols specified in the sensor's monitoring plan in accordance with the amounts of time specified in the sensor's monitoring plan;

generating from time to time, by each sensor, an execution report comprising, for each channel and protocol monitored by the sensor, the actual time spent at the channel and protocol, the actual amount of data collected from the channel and protocol, and data captured from the channel and protocol;

transmitting from time to time, by each sensor to the orchestrator, the execution report generated by the sensor;

generating, by the orchestrator from the execution reports, a current time and space coverage map indicating coverage of each channel over space and time;

generating, by the orchestrator for one or more of the sensors, one or more respective updated monitoring plans, based on the current time and space coverage map; and transmitting, by the orchestrator to the one or more of the sensors, the one or more respective updated monitoring plans.

2. The method of claim 1, wherein a directive instructs the sensor to attempt to resume monitoring the same channel and protocol that it was monitoring when interrupted, for the remaining amount of time to finish.

3. The method of claim 1, wherein a directive instructs the sensor to transition to the next channel and protocol in the monitoring plan when monitoring becomes available again.

4. The method of claim 1, wherein a directive instructs the sensor to restart from the beginning of the monitoring plan when monitoring becomes available again.

5. A method for orchestrating wireless monitoring sensors to optimize their coverage of multiple data channels and protocols, comprising:

registering each of a plurality of monitoring sensors that are attached to a respective plurality of wireless hosting equipment, with an orchestrator;

generating, by the orchestrator for each of the sensors, a monitoring plan comprising a description of wireless channels and protocols for the sensor to monitor, and amounts of time that the sensor should spend monitoring each channel and protocol prior to advancing to a next channel and protocol, wherein the monitoring plans attempt to maximize average coverage by the sensors across all channels and protocols while retaining redundancy of sensor coverage;

transmitting, by the orchestrator to each of the sensors, the monitoring plan generated by the orchestrator for the sensor;

attempting, by each of the sensors via the sensor's hosting equipment, to monitor the channels and protocols specified in the sensor's monitoring plan in accordance with the amounts of time specified in the sensor's monitoring plan;

generating from time to time, by each sensor, an execution report comprising, for each channel and protocol monitored by the sensor, the actual time spent at the channel and protocol, the actual amount of data collected from the channel and protocol, and data captured from the channel and protocol;

transmitting from time to time, by each sensor to the orchestrator, the execution report generated by the sensor;

generating, by the orchestrator from the execution reports, a current time and space coverage map indicating coverage of each channel over space and time;

generating, by the orchestrator for one or more of the sensors, one or more respective updated monitoring plans, based on the current time and space coverage map;

transmitting, by the orchestrator to the one or more of the sensors, the one or more respective updated monitoring plans; and determining, by the orchestrator from time to time, current locations of the sensors.

6. The method of claim 5 wherein said determining is based on RSSI and source MAC address information in beacon frames transmitted by one or more the sensors in their respective one or more execution reports.

7. The method of claim 5, wherein said determining comprises:

generating a feature vector for each sensor, each entry in the feature vector comprising an average RSSI for a MAC address of a wireless access point in data captured by the sensor from a channel and protocol; and spatially clustering the generated feature vectors, and wherein the monitoring plans attempt to maximize average coverage across all channels and protocols in each cluster.

8. The method of claim 7 wherein entries in the feature vector of each sensor comprise average received signal strength indicator (RSSI) for media access control (MAC) addresses of wireless access points that publish network names.

9. The method of claim 7, further comprising:

generating, by the orchestrator for one or more of the sensors, respective one or more updated monitoring plans, when a specific sensor is moved out if its spatial cluster; and transmitting, by the orchestrator to the one or more of the sensors, the respective one or more updated monitoring plans.

10. A method for orchestrating wireless monitoring sensors to optimize their coverage of multiple data channels and protocols, comprising:

registering each of a plurality of monitoring sensors that are attached to a respective plurality of wireless hosting equipment, with an orchestrator;

generating, by the orchestrator for each of the sensors, a monitoring plan comprising a description of wireless channels and protocols for the sensor to monitor, and amounts of time that the sensor should spend monitoring each channel and protocol prior to advancing to a next channel and protocol, wherein the monitoring plans attempt to maximize average coverage by the sensors across all channels and protocols while retaining redundancy of sensor coverage;

transmitting, by the orchestrator to each of the sensors, the monitoring plan generated by the orchestrator for the sensor;

attempting, by each of the sensors via the sensor's hosting equipment, to monitor the channels/protocols specified in the sensor's monitoring plan in accordance with the amounts of time specified in the sensor's monitoring plan;

generating from time to time, by each sensor, an execution report comprising, for each channel and protocol monitored by the sensor, the actual time spent at the channel and protocol, the actual amount of data collected from the channel and protocol, and data captured from the channel and protocol;

transmitting from time to time, by each sensor to the orchestrator, the execution report generated by the sensor;

generating, by the orchestrator from the execution reports, a current time and space coverage map indicating coverage of each channel over space and time;

generating, by the orchestrator for one or more of the sensors, one or more respective updated monitoring plans, based on the current time and space coverage map;

transmitting, by the orchestrator to the one or more of the sensors, the one or more respective updated monitoring plans;

recognizing, by one of the sensors, a channel and/or protocol that is missing from the sensor's monitoring plan;

transmitting, by the sensor to the orchestrator, information regarding the missing channel and/or protocol;

generating, by the orchestrator, one or more updated monitoring plans for respective one of more of the sensors, to cover the missing channel and/or protocol; and transmitting, by the orchestrator to the one or more of the sensors, the respective one or more updated monitoring plans.

* * * * *